United States Patent [19]

Butter et al.

[11] 3,832,847
[45] Sept. 3, 1974

[54] REGENERATIVELY COOLED ROCKET COMBUSTION CHAMBER WITH SLOTS BETWEEN COOLING CHANNELS

[75] Inventors: Karl Butter; Otto Tuscher, both of Munich; Manfred Christl, Taufkirchen, all of Germany

[73] Assignee: Messerschmitt-Bolkow-Blohm GmbH, Munich, Germany

[22] Filed: June 16, 1972

[21] Appl. No.: 263,693

[30] Foreign Application Priority Data
July 24, 1971  Germany............................ 2137109

[52] U.S. Cl..................................... 60/267, 60/260
[51] Int. Cl............................................ F02k 11/02
[58] Field of Search...................... 60/260, 267, 271

[56] References Cited
UNITED STATES PATENTS

| | | | |
|---|---|---|---|
| 2,844,939 | 7/1958 | Schultz............................ | 60/267 |
| 3,066,702 | 12/1972 | Tumavicus.......................... | 60/267 |
| 3,353,359 | 11/1967 | Webb................................ | 60/267 |
| 3,595,023 | 7/1971 | Stockel............................. | 60/260 |
| 3,605,412 | 9/1971 | Stockel............................. | 60/267 |
| 3,690,103 | 9/1972 | Dederia et al. ..................... | 60/267 |

FOREIGN PATENTS OR APPLICATIONS
1,019,176  10/1952  France................................. 60/260

*Primary Examiner*—William L. Freeh
*Assistant Examiner*—Warren Olsen
*Attorney, Agent, or Firm*—McGlew and Tuttle

[57] ABSTRACT

A regeneratively cooled rocket combustion chamber includes a combustion chamber having a thrust nozzle with a thrust gas discharge and which includes an outer wall and and inner wall having cooling channels defined therebetween extending longitudinally which are spaced apart in a circumferential direction by radially extending slots therebetween which open into the combustion chamber and which extend at their opposite ends to the outer wall.

4 Claims, 2 Drawing Figures

PATENTED SEP 3 1974  3,832,847

3,832,847

REGENERATIVELY COOLED ROCKET COMBUSTION CHAMBER WITH SLOTS BETWEEN COOLING CHANNELS

BACKGROUND OF THE INVENTION

1. Field of the Invention

This invention relates in general to the construction of combustion chambers, and, in particular, to a new and useful regeneratively cooled rocket combustion chamber and to a method of forming a rocket engine.

2. Description of the Prior Art

The present invention is particularly applicable to rocket engine constructions and particularly regeneratively regneeratively cooled rocket combustion chamber with a thrust nozzle and which has walls with cooling channels for cooling the combustion chamber interior wall surface. In the known constructions, the advantages resulting from an unsectioned internal contour of the inner wall or shell of the combustion chamber, and which has a minimum surface to be cooled on the hot gas side, is offset by the disadvantage of the critical shearing stress conditions which are generated at the transition points between the inner wall or shell and the cooling channel webs which separate the individual cooling channels. If the inner shell of the rocket combustion chamber, which has a thrust nozzle, comprises sections lying on a circle and includes cooling channels of semicircular cross-section extending radially inwardly therebetween, the disadvantages mentioned are no longer apparent.

On the other hand, sectioning of the inner shell on the hot gas side results in a comparatively large surface to be cooled, which is a disadvantage.

SUMMARY OF THE INVENTION

The present invention provides a rocket engine with a combustion chamber which is of simple construction and which combines the advantages of the known constructions but avoids the disadvantages thereof. With the inventive construction, the combustion chamber walls are formed with longitudinally extending cooling channels which are separated by radially extending slots located between the channels and which are arranged around its circumference. The slots extend from the outer wall into the combustion chamber to the hot gas side. A rocket combustion chamber with a thrust nozzle, according to the invention, provides many advantages: For one thing, because of the absence of cross-sectioning on the hot gas side of the inner shell or wall, the surface thereof exposed to the hot gases is a minimum. In addition, under mechanical and thermal load, the cross-sectional areas of the cooling channels can breathe freely as a result of the slots therebetween so that they can easily expand and contract under thermal changes.

This eliminates the development of shearing stresses in the web transitions to the inner shell which were difficult to express mathematically and thus were an obstacle to an exact static determination of the combustion chamber with the thrust nozzle design.

The combustion chamber and thrust nozzle may be made very inexpensively by forming both the inner shell wall and the outer covering wall by electroplating. With the method of the invention, a cylindrical mandrel of the size of the interior combustion chamber space which has a plurality of circumferentially spaced radially extending projections is employed to electroplate the inner wall and the cooling channel inner walls over the mandrel. To facilitate this, an electrically conducting core of suitable shape and of a material which permits dissolution of the core, such as an alloy of aluminum, magnesium and copper is employed. After the cooling channels in the inner wall are formed over the mandrel, the core is etched out with a sodium hydroxide solution.

As a further variant of the invention, flow paths leading from the outside to the bottom of the slots in the cooling channel webs, at least in the combustion chambers or thrust nozzle zones which are subject to especially high thermal load, are provided.

These flow paths serve to supply a cooling medium which forms the cooling wall veil or layer at the slot walls and provides a so-called "curtain cooling."

Accordingly, it is an object of the invention to provide an improved combustion chamber construction which includes a thrust nozzle portion and which has a wall with longitudinally extending cooling channels which are separated by slots which extend from the interior of the combustion chamber to the outer wall.

A further object of the invention is to provide a method of forming a combustion chamber for a rocket engine, and the like, using a mandrel of a fusable material having radially extending and circumferentially spaced projections comprises forming cooling channels in the interior wall of a combustion chamber by electroplating onto the mandrel to coat the surfaces on each side and between the projections to form a cooling channels side and bottom walls, thereafter electroplating the outer wall to close over the spaces between the cooling channel sidewalls and to form the outer wall of the combustion chamber.

A further object of the invention is to provide a combustion chamber with thrust nozzle construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
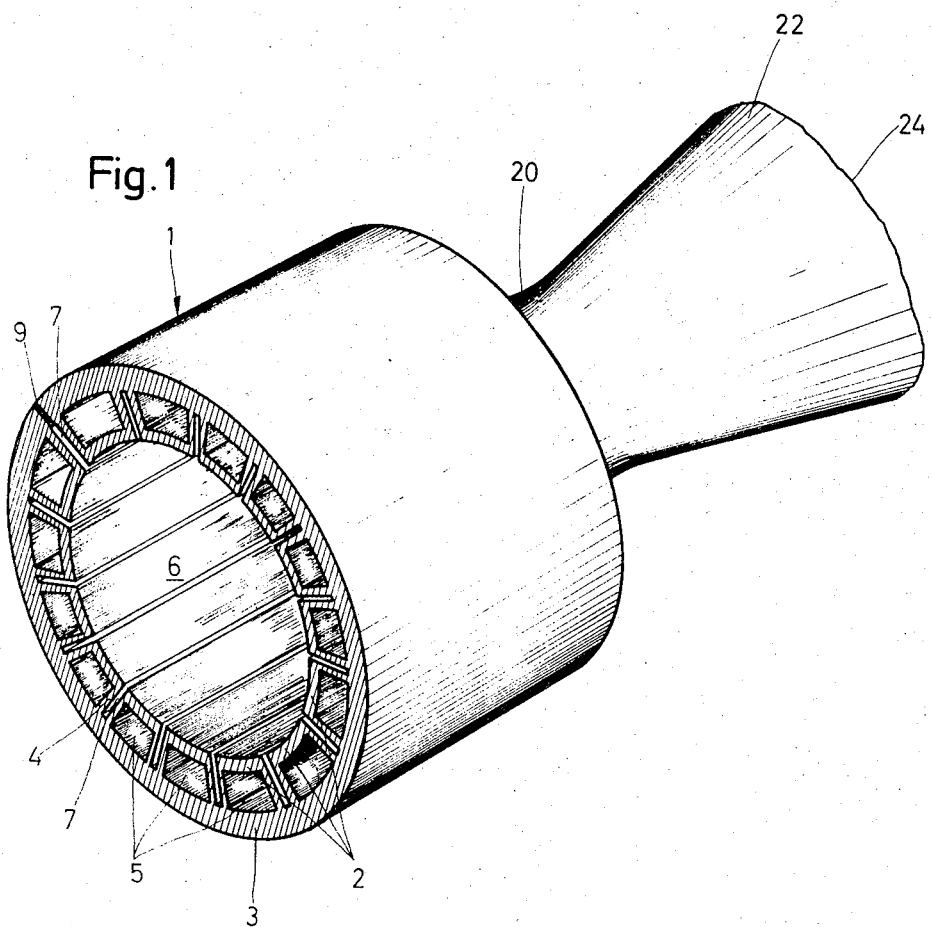
FIG. 1 is a perspective view of a combustion chamber with the head portion broken away constructed in accordance with the invention.

Referring to the drawings in particular, the invention embodied therein comprises, as shown in FIG. 1, a rocket combustion chamber with a thrust nozzle or a rocket combustion engine, generally designated 1, which includes a thrust nozzle 20 which ends in a thrust gas discharge section 22 having a thrust gas discharge 24.

In accordance with the invention, the combustion chamber 1 comprises an inner wall or shell 2, an outer wall or shell 3, and radially extending connecting webs or cooling channel walls 4, which extend in a radial direction from the interior hot gas space or combustion chamber space 6 to the outer wall 3. The webs 4 form the lateral limitations of longitudinally extending cooling channels 5 which have cross-sections which vary over the length of the channels. In accordance with a feature of the invention, radially extending slots 7 extend from the hot gas side or combustion chamber 6 outwardly to the outer wall 2.

At one or more locations around the periphery of the outer wall 1, there is provided a connection or flow path 9 for cooling media which may be admitted to form a cooling media flow or veil over the surfaces of the webs and portions of the interior combustion chamber walls. At heavy thermal loads, it is advisable to provide such flow paths 9 at least in the zone of the thrust nozzle neck or area of narrowest crosssection of the thrust nozzle 20.

In accordance with the invention, the rocket engine or combustion chamber with the thrust nozzle, generally designated 1, is formed by electroplating.

Figure 2:
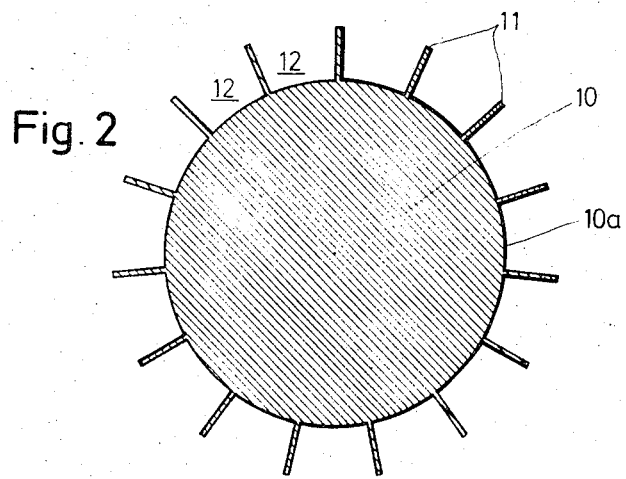
FIG. 2 is a transverse sectional view of an electroplating core used in the formation of the combustion chamber shown in FIG. 1.

For this purpose a core 10, shown in FIG. 2, is first made up which includes a plurality of radially extending and circumferentially spaced projections 11 which extend outwardly from a cylindrical surface 10a and define depressions or recesses 12 therebetween. The core 10 is then covered by an electroplating material in an electroplating operation in which the inner shell or wall 2 and the webs of sidewalls 4 are formed between the projections 11 and over the surface 10a of the mandrel. The outer or free web ends are then machined to form the end faces so that they can receive an electroplated deposit or layer forming the outer wall 3. After the machining, the faces are waxed along with the cooling channels 5 which are formed between the webs 4, 4 and then the outer wall or shell 3 is electroplated on.

Thereafter, in accordance with the method of the invention, inlet and outlet holes are drilled into the outer wall. These openings provided means for the escape of the wax which is fused-out in a further operation by further heating.

Lastly, the electroplating core 10 is hollowed out by chip-removing and by shaping-down to a wall thickness of a few millimeters.

The hollow core residue is then etched out with a sodium hydroxide solution. The electroplating core 10 advantageously comprises, for example, an aluminum or an aluminum-magnesium copper alloy.

While specific embodiments of the invention have been shown and described in detail to illustrate the application of the principles of the invention, it will be understood that the invention may be embodied otherwise without departing from such principles.

What is claimed is:

1. A regeneratively cooled rocket combustion chamber with a thrust nozzle, comprising an outer continuous annular rigid metal wall portion and an inner plurality of discontinuous rigid metal wall portions arranged substantially parallel to and spaced radially inwardly from said outer wall portion and extending in a complete annulus, a plurality of radially extending and circumferentially spaced rigid metal sidewall portions extending between said inner and outer wall portions, all of said wall portions being integrally formed and defining a plurality of longitudinally extending and circumferentially spaced cooling channels with a radially extending slot between each channel extending from the inner surface of said inner wall portion to the outer wall between adjacent cooling channels.

2. A regeneratively cooled rocket combustion chamber, according to claim 1, including a cooling medium conduit extending through the outer wall into at least one slot between the adjacent cooling channels defining a cooling medium passage.

3. A regeneratively cooled rocket combustion chamber, according to claim 1, wherein said combustion chamber includes a narrow neck thrust nozzle portion and a cooling medium passage defined through the outer wall leading into one of said slots between said cooling passages.

4. A regeneratively cooled rocket combustion chamber with thrust nozzle according to claim 1, wherein said sidewalls and said inner and outer walls are made of an electroplated metal material.

* * * * *